(12) United States Patent
Zones et al.

(10) Patent No.: US 7,992,375 B2
(45) Date of Patent: Aug. 9, 2011

(54) TREATMENT OF ENGINE EXHAUST USING MOLECULAR SIEVE SSZ-73

(75) Inventors: Stacey Zones, San Francisco, CA (US); Allen Burton, Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 31 days.

(21) Appl. No.: 11/320,445

(22) Filed: Dec. 27, 2005

(65) Prior Publication Data

US 2007/0144147 A1 Jun. 28, 2007

(51) Int. Cl.
*F01N 3/00* (2006.01)

(52) U.S. Cl. ......... 60/284; 60/274; 60/297; 423/329.1; 423/701; 423/718

(58) Field of Classification Search ............ 60/274, 60/284, 297, 299; 422/170, 171, 177; 423/324, 423/328.1, 328.2, 329.1, 700, 701, 718
See application file for complete search history.

(56) References Cited

U.S. PATENT DOCUMENTS

| | | | | |
|---|---|---|---|---|
| 4,496,528 A * | 1/1985 | Bourgogne et al. | ........... | 423/701 |
| 5,232,675 A * | 8/1993 | Shu et al. | ................ | 423/328.2 |
| 5,268,161 A * | 12/1993 | Nakagawa | ................ | 423/702 |
| 5,939,044 A * | 8/1999 | Nakagawa et al. | ........... | 423/706 |
| 6,729,129 B2 * | 5/2004 | Yamamoto et al. | ............. | 60/297 |
| 6,840,984 B2 * | 1/2005 | Brück et al. | ................... | 96/108 |
| 6,912,847 B2 * | 7/2005 | Deeba | ............................ | 60/297 |
| 6,921,524 B2 * | 7/2005 | Mathieu et al. | ............... | 423/718 |
| 7,025,948 B2 * | 4/2006 | Barea et al. | ................... | 423/718 |
| 7,029,651 B2 * | 4/2006 | Canos et al. | .................. | 423/718 |
| 7,108,843 B2 * | 9/2006 | Zones et al. | ................... | 423/718 |
| 7,129,202 B2 * | 10/2006 | Lyu et al. | ...................... | 510/504 |
| 7,138,099 B1 | 11/2006 | Zones et al. | | |
| 2002/0187896 A1 * | 12/2002 | Ryoo et al. | .................... | 502/418 |
| 2004/0220045 A1 * | 11/2004 | Mathieu et al. | ................. | 502/60 |

OTHER PUBLICATIONS

SAS Framework Datasheet, Baerlocher et al., Atlas of Zeolite Framework Types 5th Ed. (2001.
UOZ Framework Datasheet, Baerlocher et al., Atlas of Zeolite Framework Types 5th Ed. (2001).
SAS Building Scheme, Koningsveld, Compendium of Zeolite Framework Types, Elsevier, 2007.
UOZ Building Scheme, Koningsveld, Compendium of Zeolite Framework Types, Elsevier, 2007.

* cited by examiner

*Primary Examiner* — Tu M Nguyen

(74) *Attorney, Agent, or Firm* — Erich Joseph Gess

(57) ABSTRACT

The present invention relates to new crystalline, essentially all silicon oxide molecular sieve SSZ-73 prepared using a 3-ethyl-1,3,8,8-tetramethyl-3-azoniabicyclo[3.2.1]octane cation as a structure-directing agent, and its use in treating engine exhaust.

8 Claims, No Drawings

TREATMENT OF ENGINE EXHAUST USING MOLECULAR SIEVE SSZ-73

BACKGROUND OF THE INVENTION

1. Field of the Invention

The present invention relates to new crystalline, essentially all silicon oxide molecular sieve SSZ-73, a method for preparing SSZ-73 using a 3-ethyl-1,3,8,8-tetramethyl-3-azoniabicyclo[3.2.1]octane cation as a structure directing agent ("SDA") and uses for SSZ-73.

2. State of the Art

Because of their unique sieving characteristics, as well as their catalytic properties, crystalline molecular sieves and zeolites are especially useful in applications such as hydrocarbon conversion, gas drying and separation. Although many different crystalline molecular sieves have been disclosed, there is a continuing need for new molecular sieves with desirable properties for gas separation and drying, hydrocarbon and chemical conversions, and other applications. New molecular sieves may contain novel internal pore architectures, providing enhanced selectivities in these processes.

Gaseous waste products resulting from the combustion of hydrocarbonaceous fuels, such as gasoline and fuel oils, comprise carbon monoxide, hydrocarbons and nitrogen oxides as products of combustion or incomplete combustion, and pose a serious health problem with respect to pollution of the atmosphere. While exhaust gases from other carbonaceous fuel-burning sources, such as stationary engines, industrial furnaces, etc., contribute substantially to air pollution, the exhaust gases from automotive engines are a principal source of pollution. Because of these health problem concerns, the Environmental Protection Agency (EPA) has promulgated strict controls on the amounts of carbon monoxide, hydrocarbons and nitrogen oxides which automobiles can emit. The implementation of these controls has resulted in the use of catalytic converters to reduce the amount of pollutants emitted from automobiles.

In order to achieve the simultaneous conversion of carbon monoxide, hydrocarbon and nitrogen oxide pollutants, it has become the practice to employ catalysts in conjunction with air-to-fuel ratio control means which functions in response to a feedback signal from an oxygen sensor in the engine exhaust system. Although these three component control catalysts work quite well after they have reached operating temperature of about 300° C., at lower temperatures they are not able to convert substantial amounts of the pollutants. What this means is that when an engine and in particular an automobile engine is started up, the three component control catalyst is not able to convert the hydrocarbons and other pollutants to innocuous compounds.

Adsorbent beds have been used to adsorb the hydrocarbons during the cold start portion of the engine. Although the process typically will be used with hydrocarbon fuels, the instant invention can also be used to treat exhaust streams from alcohol fueled engines. The adsorbent bed is typically placed immediately before the catalyst. Thus, the exhaust stream is first flowed through the adsorbent bed and then through the catalyst. The adsorbent bed preferentially adsorbs hydrocarbons over water under the conditions present in the exhaust stream. After a certain amount of time, the adsorbent bed has reached a temperature (typically about 150° C.) at which the bed is no longer able to remove hydrocarbons from the exhaust stream. That is, hydrocarbons are actually desorbed from the adsorbent bed instead of being adsorbed. This regenerates the adsorbent bed so that it can adsorb hydrocarbons during a subsequent cold start.

The prior art reveals several references dealing with the use of adsorbent beds to minimize hydrocarbon emissions during a cold start engine operation. One such reference is U.S. Pat. No. 3,699,683 in which an adsorbent bed is placed after both a reducing catalyst and an oxidizing catalyst. The patentees disclose that when the exhaust gas stream is below 200° C. the gas stream is flowed through the reducing catalyst then through the oxidizing catalyst and finally through the adsorbent bed, thereby adsorbing hydrocarbons on the adsorbent bed. When the temperature goes above 200° C. the gas stream which is discharged from the oxidation catalyst is divided into a major and minor portion, the major portion being discharged directly into the atmosphere and the minor portion passing through the adsorbent bed whereby unburned hydrocarbon is desorbed and then flowing the resulting minor portion of this exhaust stream containing the desorbed unburned hydrocarbons into the engine where they are burned.

Another reference is U.S. Pat. No. 2,942,932 which teaches a process for oxidizing carbon monoxide and hydrocarbons which are contained in exhaust gas streams. The process disclosed in this patent consists of flowing an exhaust stream which is below 800° F. into an adsorption zone which adsorbs the carbon monoxide and hydrocarbons and then passing the resultant stream from this adsorption zone into an oxidation zone. When the temperature of the exhaust gas stream reaches about 800° F. the exhaust stream is no longer passed through the adsorption zone but is passed directly to the oxidation zone with the addition of excess air.

U.S. Pat. No. 5,078,979, issued Jan. 7, 1992 to Dunne, which is incorporated herein by reference in its entirety, discloses treating an exhaust gas stream from an engine to prevent cold start emissions using a molecular sieve adsorbent bed. Examples of the molecular sieve include faujasites, clinoptilolites, mordenites, chabazite, silicalite, zeolite Y, ultrastable zeolite Y, and ZSM-5.

Canadian Patent No. 1,205,980 discloses a method of reducing exhaust emissions from an alcohol fueled automotive vehicle. This method consists of directing the cool engine startup exhaust gas through a bed of zeolite particles and then over an oxidation catalyst and then the gas is discharged to the atmosphere. As the exhaust gas stream warms up it is continuously passed over the adsorption bed and then over the oxidation bed.

SUMMARY OF THE INVENTION

The present invention is directed to a family of crystalline molecular sieves with unique properties, referred to herein as "molecular sieve SSZ-73" or simply "SSZ-73". SSZ-73 is obtained in its silicate form. The term "silicate" refers to a molecular sieve containing all silicon oxide or a very high mole ratio of silicon oxide to another oxide.

SSZ-73 is a crystalline molecular sieve comprising essentially all silicon oxide and having, after calcination, the X-ray diffraction lines of Table II. As used herein, "essentially all silicon oxide" or "essentially all-silica" means that the molecular sieve's crystal structure is comprised of only silicon oxide or is comprised of silicon oxide and only trace amounts of other oxides, such as aluminum oxide, which may be introduced as impurities in the source of silicon oxide.

SSZ-73 is unusual in that it is only one-dimensional with small pores, yet has a very large micropore volume due to its sizeable cages. SSZ-73 has a nitrogen micropore volume of 0.25 cc/gm. This is surprisingly high for a one-dimensional molecular sieve. SSZ-73 also has an unexpectedly high surface area of about 585 m²/gm.

This invention generally relates to a process for treating an engine exhaust stream and in particular to a process for minimizing emissions during the cold start operation of an engine. Accordingly, the present invention provides a process for treating a cold-start engine exhaust gas stream containing hydrocarbons and other pollutants consisting of flowing said engine exhaust gas stream over a molecular sieve bed which preferentially adsorbs the hydrocarbons over water to provide a first exhaust stream, and flowing the first exhaust gas stream over a catalyst to convert any residual hydrocarbons and other pollutants contained in the first exhaust gas stream to innocuous products and provide a treated exhaust stream and discharging the treated exhaust stream into the atmosphere, the molecular sieve bed characterized in that it comprises a crystalline molecular sieve comprising essentially all silicon oxide and having, after calcination, the X-ray diffraction lines of Table II.

The present invention further provides such a process wherein the engine is an internal combustion engine, including automobile engines, which can be fueled by a hydrocarbonaceous fuel.

Also provided by the present invention is such a process wherein the molecular sieve has deposited on it a metal selected from the group consisting of platinum, palladium, rhodium, ruthenium, and mixtures thereof.

DETAILED DESCRIPTION OF THE INVENTION

As stated this invention generally relates to a process for treating an engine exhaust stream and in particular to a process for minimizing emissions during the cold start operation of an engine. The engine consists of any internal or external combustion engine which generates an exhaust gas stream containing noxious components or pollutants including unburned or thermally degraded hydrocarbons or similar organics. Other noxious components usually present in the exhaust gas include nitrogen oxides and carbon monoxide. The engine may be fueled by a hydrocarbonaceous fuel. As used in this specification and in the appended claims, the term "hydrocarbonaceous fuel" includes hydrocarbons, alcohols and mixtures thereof. Examples of hydrocarbons which can be used to fuel the engine are the mixtures of hydrocarbons which make up gasoline or diesel fuel. The alcohols which may be used to fuel engines include ethanol and methanol. Mixtures of alcohols and mixtures of alcohols and hydrocarbons can also be used. The engine may be a jet engine, gas turbine, internal combustion engine, such as an automobile, truck or bus engine, a diesel engine or the like. The process of this invention is particularly suited for hydrocarbon, alcohol, or hydrocarbon-alcohol mixture, internal combustion engine mounted in an automobile. For convenience the description will use hydrocarbon as the fuel to exemplify the invention. The use of hydrocarbon in the subsequent description is not to be construed as limiting the invention to hydrocarbon fueled engines.

When the engine is started up, it produces a relatively high concentration of hydrocarbons in the engine exhaust gas stream as well as other pollutants. Pollutants will be used herein to collectively refer to any unburned fuel components and combustion byproducts found in the exhaust stream. For example, when the fuel is a hydrocarbon fuel, hydrocarbons, nitrogen oxides, carbon monoxide and other combustion byproducts will be found in the engine exhaust gas stream. The temperature of this engine exhaust stream is relatively cool, generally below 500° C. and typically in the range of 200° to 400° C. This engine exhaust stream has the above characteristics during the initial period of engine operation, typically for the first 30 to 120 seconds after startup of a cold engine. The engine exhaust stream will typically contain, by volume, about 500 to 1000 ppm hydrocarbons.

The engine exhaust gas stream which is to be treated is flowed over a molecular sieve bed comprising molecular sieve SSZ-56 a first exhaust stream. Molecular sieve SSZ-56 is described below. The first exhaust stream which is discharged from the molecular sieve bed is now flowed over a catalyst to convert the pollutants contained in the first exhaust stream to innocuous components and provide a treated exhaust stream which is discharged into the atmosphere. It is understood that prior to discharge into the atmosphere, the treated exhaust stream may be flowed through a muffler or other sound reduction apparatus well known in the art.

The catalyst which is used to convert the pollutants to innocuous components is usually referred to in the art as a three-component control catalyst because it can simultaneously oxidize any residual hydrocarbons present in the first exhaust stream to carbon dioxide and water, oxidize any residual carbon monoxide to carbon dioxide and reduce any residual nitric oxide to nitrogen and oxygen. In some cases the catalyst may not be required to convert nitric oxide to nitrogen and oxygen, e.g., when an alcohol is used as the fuel. In this case the catalyst is called an oxidation catalyst. Because of the relatively low temperature of the engine exhaust stream and the first exhaust stream, this catalyst does not function at a very high efficiency, thereby necessitating the molecular sieve bed.

When the molecular sieve bed reaches a sufficient temperature, typically about 150-200° C., the pollutants which are adsorbed in the bed begin to desorb and are carried by the first exhaust stream over the catalyst. At this point the catalyst has reached its operating temperature and is therefore capable of fully converting the pollutants to innocuous components.

The adsorbent bed used in the instant invention can be conveniently employed in particulate form or the adsorbent can be deposited onto a solid monolithic carrier. When particulate form is desired, the adsorbent can be formed into shapes such as pills, pellets, granules, rings, spheres, etc. In the employment of a monolithic form, it is usually most convenient to employ the adsorbent as a thin film or coating deposited on an inert carrier material which provides the structural support for the adsorbent. The inert carrier material can be any refractory material such as ceramic or metallic materials. It is desirable that the carrier material be unreactive with the adsorbent and not be degraded by the gas to which it is exposed. Examples of suitable ceramic materials include sillimanite, petalite, cordierite, mullite, zircon, zircon mullite, spondumene, alumina-titanate, etc. Additionally, metallic materials which are within the scope of this invention include metals and alloys as disclosed in U.S. Pat. No. 3,920,583 which are oxidation resistant and are otherwise capable of withstanding high temperatures.

The carrier material can best be utilized in any rigid unitary configuration which provides a plurality of pores or channels extending in the direction of gas flow. It is preferred that the configuration be a honeycomb configuration. The honeycomb structure can be used advantageously in either unitary form, or as an arrangement of multiple modules. The honeycomb structure is usually oriented such that gas flow is generally in the same direction as the cells or channels of the honeycomb structure. For a more detailed discussion of monolithic structures, refer to U.S. Pat. Nos. 3,785,998 and 3,767,453.

The molecular sieve is deposited onto the carrier by any convenient way well known in the art. A preferred method involves preparing a slurry using the molecular sieve and coating the monolithic honeycomb carrier with the slurry. The slurry can be prepared by means known in the art such as combining the appropriate amount of the molecular sieve and a binder with water. This mixture is then blended by using means such as sonification, milling, etc. This slurry is used to coat a monolithic honeycomb by dipping the honeycomb into the slurry, removing the excess slurry by draining or blowing out the channels, and heating to about 100° C. If the desired loading of molecular sieve is not achieved, the above process may be repeated as many times as required to achieve the desired loading.

Instead of depositing the molecular sieve onto a monolithic honeycomb structure, one can take the molecular sieve and form it into a monolithic honeycomb structure by means known in the art.

The adsorbent may optionally contain one or more catalytic metals dispersed thereon. The metals which can be dispersed on the adsorbent are the noble metals which consist of platinum, palladium, rhodium, ruthenium, and mixtures thereof. The desired noble metal may be deposited onto the adsorbent, which acts as a support, in any suitable manner well known in the art. One example of a method of dispersing the noble metal onto the adsorbent support involves impregnating the adsorbent support with an aqueous solution of a decomposable compound of the desired noble metal or metals, drying the adsorbent which has the noble metal compound dispersed on it and then calcining in air at a temperature of about 400° to about 500° C. for a time of about 1 to about 4 hours. By decomposable compound is meant a compound which upon heating in air gives the metal or metal oxide. Examples of the decomposable compounds which can be used are set forth in U.S. Pat. No. 4,791,091 which is incorporated by reference. Preferred decomposable compounds are chloroplatinic acid, rhodium trichloride, chloropalladic acid, hexachloroiridate (IV) acid and hexachlororuthenate. It is preferable that the noble metal be present in an amount ranging from about 0.01 to about 4 weight percent of the adsorbent support. Specifically, in the case of platinum and palladium the range is 0.1 to 4 weight percent, while in the case of rhodium and ruthenium the range is from about 0.01 to 2 weight percent.

These catalytic metals are capable of oxidizing the hydrocarbon and carbon monoxide and reducing the nitric oxide components to innocuous products. Accordingly, the adsorbent bed can act both as an adsorbent and as a catalyst.

The catalyst which is used in this invention is selected from any three component control or oxidation catalyst well known in the art. Examples of catalysts are those described in U.S. Pat. Nos. 4,528,279; 4,791,091; 4,760,044; 4,868,148; and 4,868,149, which are all incorporated by reference. Preferred catalysts well known in the art are those that contain platinum and rhodium and optionally palladium, while oxidation catalysts usually do not contain rhodium. Oxidation catalysts usually contain platinum and/or palladium metal. These catalysts may also contain promoters and stabilizers such as barium, cerium, lanthanum, nickel, and iron. The noble metals promoters and stabilizers are usually deposited on a support such as alumina, silica, titania, zirconia, alumino silicates, and mixtures thereof with alumina being preferred. The catalyst can be conveniently employed in particulate form or the catalytic composite can be deposited on a solid monolithic carrier with a monolithic carrier being preferred. The particulate form and monolithic form of the catalyst are prepared as described for the adsorbent above.

The molecular sieve used in the adsorbent bed, SSZ-73, comprises a crystalline molecular sieve comprising essentially all silicon oxide and having, after calcination, the X-ray diffraction lines of Table II. It is believed SSZ-73 has a framework topology similar to that of the molecular sieve designated STA-6. That framework topology has been designated "SAS" by the IZA. However, STA-6 is a metallo aluminophosphate, whereas SSZ-73 is a silicon-containing molecular sieve. SSZ-73 is unusual in that it is only one-dimensional with small pores, yet has a very large micropore volume due to its sizeable cages. SSZ-73 has a nitrogen micropore volume of 0.25 cc/gm. This is surprisingly high for a one-dimensional molecular sieve. SSZ-73 also has an unexpectedly high surface area of about 585 m²/gm.

In preparing SSZ-73, a 3-ethyl-1,3,8,8-tetramethyl-3-azoniabicyclo[3.2.1]octane cation is used as a structure directing agent ("SDA"), also known as a crystallization template. The SDA useful for making SSZ-73 has the following structure:

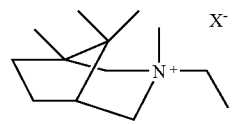

3-Ethyl-1,3,8,8-tetramethyl-3-azonia-bicyclo[3.2.1]octane

The SDA cation is associated with an anion (X⁻) which may be any anion that is not detrimental to the formation of the SSZ-73. Representative anions include halogen, e.g., fluoride, chloride, bromide and iodide, hydroxide, acetate, sulfate, tetrafluoroborate, carboxylate, and the like. Hydroxide is the most preferred anion. The structure directing agent (SDA) may be used to provide hydroxide ion. Thus, it is beneficial to ion exchange, for example, a halide to hydroxide ion.

The 3-ethyl-1,3,8,8-tetramethyl-3-azonia-bicyclo[3.2.1] octane cation SDA can be prepared by a method similar to that described in U.S. Pat. No. 5,268,161, issued Dec. 7, 1993 to Nakagawa, which discloses a method for preparing 1,3,3,8, 8-pentamethyl-3-azoniabicyclo[3.2.1]octane cation. U.S. Pat. No. 5,268,161 is incorporated by reference herein in its entirety.

In general, SSZ-73 is prepared by contacting an active source of silicon oxide with the 3-ethyl-1,3,8,8-tetramethyl-3-azoniabicyclo[3.2.1]octane cation SDA in the presence of fluoride ion.

SSZ-73 is prepared from a reaction mixture comprising silicon oxide and the following (expressed in terms of mole ratios):

TABLE A

| Reaction Mixture | | |
|---|---|---|
| | Typical | Preferred |
| OH—/SiO$_2$ | 0.20-0.80 | 0.40-0.60 |
| Q/SiO$_2$ | 0.20-0.80 | 0.40-0.60 |
| M$_{2/n}$/SiO$_2$ | 0-0.04 | 0-0.025 |
| H$_2$O/SiO$_2$ | 2-10 | 3-7 |
| HF/SiO$_2$ | 0.20-0.80 | 0.30-0.60 | where M is an alkali metal cation, alkaline earth metal cation or mixtures thereof; n is the valence of M (i.e., 1 or 2); Q is a 3-ethyl-1,3,8,8-tetramethyl-3-azoniabicyclo[3.2.1]octane cation and F is fluoride.

A preferred active source of silicon oxide is tetraethyl orthosilicate.

If it is desired that SSZ-73 have catalytic activity, small amounts of a metal oxide, such as aluminum oxide, may be introduced into the framework of the SSZ-73. This can be done by adding an active source of, e.g., aluminum oxide into the reaction mixture, resulting in silicoaluminate having a $SiO_2/Al_2O_3$ mole ratio of about 400/1.

In practice, SSZ-73 is prepared by a process comprising:

(a) preparing an aqueous solution containing a source(s) of silicon oxide, a source of fluoride ion and a 3-ethyl-1,3,8,8-tetramethyl-3-azoniabicyclo[3.2.1]octane cation having an anionic counterion which is not detrimental to the formation of SSZ-73;

(b) maintaining the aqueous solution under conditions sufficient to form crystals of SSZ-73; and (c) recovering the crystals of SSZ-73.

The reaction mixture is maintained at an elevated temperature until the crystals of the SSZ-73 are formed. The hydrothermal crystallization is usually conducted under autogenous pressure, at a temperature between 100° C. and 200° C., preferably between 135° C. and 180° C. The crystallization period is typically greater than 1 day and preferably from about 3 days to about 20 days. The molecular sieve may be prepared using mild stirring or agitation.

During the hydrothermal crystallization step, the SSZ-73 crystals can be allowed to nucleate spontaneously from the reaction mixture. The use of SSZ-73 crystals as seed material can be advantageous in decreasing the time necessary for complete crystallization to occur. In addition, seeding can lead to an increased purity of the product obtained by promoting the nucleation and/or formation of SSZ-73 over any undesired phases. When used as seeds, SSZ-73 crystals are added in an amount between 0.1 and 10% of the weight of first tetravalent element oxide, e.g. silica, used in the reaction mixture.

Once the molecular sieve crystals have formed, the solid product is separated from the reaction mixture by standard mechanical separation techniques such as filtration. The crystals are water-washed and then dried, e.g., at 90° C. to 150° C. for from 8 to 24 hours, to obtain the as-synthesized SSZ-73 crystals. The drying step can be performed at atmospheric pressure or under vacuum.

SSZ-73 as synthesized has the X-ray diffraction lines of Table I below. SSZ-73 has a framework topology comprising essentially all silicon oxide and has a composition, as synthesized (i.e., prior to removal of the SDA from the SSZ-73) and in the anhydrous state, comprising silicon oxide and, in terms of mole ratios, the following:

| | |
|---|---|
| $M_{2/n}/SiO_2$ | 0-0.03 |
| $Q/SiO_2$ | 0.02-0.08 |
| $F/SiO_2$ | 0.01-0.10 | wherein M is an alkali metal cation, alkaline earth metal cation or mixtures thereof; n is the valence of M (i.e., 1 or 2); Q is a 3-ethyl-1,3,8,8-tetramethyl-3-azoniabicyclo[3.2.1]octane cation and F is fluoride.

SSZ-73 is characterized by its X-ray diffraction pattern. SSZ-73, as-synthesized, has an X-ray powder diffraction pattern that exhibits the characteristic lines shown in Table I.

TABLE I

As-Synthesized SSZ-73

| 2 Theta[a] | d-spacing (Angstroms) | Relative Integrated Intensity (%)[b] |
|---|---|---|
| 8.94 | 9.88 | S |
| 10.67 | 8.28 | W |
| 16.58 | 5.34 | VS |
| 19.42 | 4.57 | M |
| 20.07 | 4.42 | VS |
| 21.41 | 4.15 | M |
| 25.47 | 3.49 | M |
| 27.69 | 3.22 | W-M |
| 30.89 | 2.89 | W |
| 33.51 | 2.67 | W-M |

[a] ±0.1
[b] The X-ray patterns provided are based on a relative intensity scale in which the strongest line in the X-ray pattern is assigned a value of 100: W(weak) is less than 20; M(medium) is between 20 and 40; S(strong) is between 40 and 60; VS(very strong) is greater than 60.

Table IA below shows the X-ray powder diffraction lines for as-synthesized SSZ-73 including actual relative intensities.

TABLE IA

As-Synthesized SSZ-73

| 2 Theta[a] | d-spacing (Angstroms) | Intensity |
|---|---|---|
| 8.94 | 9.88 | 50.2 |
| 10.67 | 8.28 | 11.1 |
| 16.58 | 5.34 | 100.0 |
| 17.65 | 5.02 | 0.5 |
| 19.42 | 4.57 | 26.1 |
| 20.07 | 4.42 | 75.9 |
| 20.94 | 4.24 | 3.6 |
| 21.41 | 4.15 | 27.6 |
| 24.51 | 3.63 | 10.7 |
| 24.96 | 3.56 | 6.0 |
| 25.47 | 3.49 | 31.2 |
| 26.57 | 3.35 | 7.9 |
| 26.75 | 3.33 | 6.6 |
| 27.04 | 3.29 | 6.2 |
| 27.69 | 3.22 | 22.8 |
| 28.53 | 3.13 | 4.5 |
| 29.68 | 3.01 | 8.2 |
| 30.89 | 2.89 | 13.4 |
| 32.62 | 2.74 | 4.8 |
| 33.19 | 2.70 | 9.2 |
| 33.51 | 2.67 | 20.5 |
| 34.91 | 2.57 | 7.7 |
| 35.62 | 2.52 | 3.0 |
| 36.06 | 2.49 | 3.1 |
| 37.09 | 2.42 | 8.5 |
| 38.63 | 2.33 | 0.9 |
| 39.47 | 2.28 | 2.1 |
| 40.45 | 2.23 | 5.0 |
| 40.77 | 2.21 | 3.7 |

[a] ±0.1

After calcination, the X-ray powder diffraction pattern for SSZ-73 exhibits the characteristic lines shown in Table II below.

TABLE II

Calcined SSZ-73

| 2 Theta[a] | d-spacing (Angstroms) | Relative Integrated Intensity (%) |
|---|---|---|
| 8.84 | 10.00 | VS |
| 10.69 | 8.27 | W |
| 12.53 | 7.06 | W |
| 16.50 | 5.37 | W |

TABLE II-continued

Calcined SSZ-73

| 2 Theta$^{(a)}$ | d-spacing (Angstroms) | Relative Integrated Intensity (%) |
|---|---|---|
| 19.54 | 4.54 | W |
| 19.88 | 4.46 | W |
| 21.49 | 4.13 | W |
| 25.23 | 3.53 | W |
| 27.48 | 3.24 | W |
| 33.38 | 2.68 | W |

$^{(a)}$±0.1

Table IIA below shows the X-ray powder diffraction lines for calcined SSZ-73 including actual relative intensities.

TABLE IIA

Calcined SSZ-73

| 2 Theta$^{(a)}$ | d-spacing (Angstroms) | Relative Integrated Intensity (%) |
|---|---|---|
| 8.84 | 10.00 | 100.0 |
| 10.69 | 8.27 | 9.8 |
| 12.53 | 7.06 | 5.1 |
| 16.50 | 5.37 | 13.1 |
| 17.75 | 4.99 | 1.1 |
| 19.54 | 4.54 | 4.9 |
| 19.88 | 4.46 | 13.1 |
| 20.79 | 4.27 | 1.1 |
| 21.49 | 4.13 | 4.4 |
| 24.35 | 3.65 | 1.5 |
| 24.96 | 3.56 | 0.7 |
| 25.23 | 3.53 | 7.9 |
| 26.54 | 3.36 | 1.0 |
| 26.79 | 3.33 | 1.8 |
| 26.99 | 3.30 | 0.6 |
| 27.48 | 3.24 | 4.2 |
| 28.27 | 3.15 | 1.4 |
| 30.81 | 2.90 | 2.3 |
| 32.32 | 2.77 | 0.7 |
| 32.34 | 2.77 | 0.4 |
| 32.91 | 2.72 | 2.5 |
| 33.38 | 2.68 | 3.6 |
| 34.96 | 2.56 | 0.1 |
| 35.21 | 2.55 | 0.5 |
| 35.36 | 2.54 | 0.3 |

$^{(a)}$±0.1

The X-ray powder diffraction patterns were determined by standard techniques. The radiation was the K-alpha/doublet of copper. The peak heights and the positions, as a function of 2θ where θ is the Bragg angle, were read from the relative intensities of the peaks, and d, the interplanar spacing in Angstroms corresponding to the recorded lines, can be calculated.

The variation in the scattering angle (two theta) measurements, due to instrument error and to differences between individual samples, is estimated at ±0.1 degrees.

Representative peaks from the X-ray diffraction pattern of calcined SSZ-73 are shown in Table II. Calcination can result in changes in the intensities of the peaks as compared to patterns of the "as-synthesized" material, as well as minor shifts in the diffraction pattern.

Crystalline SSZ-73 can be used as-synthesized, but preferably will be thermally treated (calcined). Usually, it is desirable to remove the alkali metal cation (if any) by ion exchange and replace it with hydrogen, ammonium, or any desired metal ion.

SSZ-73 can be formed into a wide variety of physical shapes. Generally speaking, the molecular sieve can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the SSZ-73 can be extruded before drying, or, dried or partially dried and then extruded.

SSZ-73 can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. No. 4,910,006, issued May 20, 1990 to Zones et al., and U.S. Pat. No. 5,316,753, issued May 31, 1994 to Nakagawa, both of which are incorporated by reference herein in their entirety.

SSZ-73 can be used as a cold start hydrocarbon trap in combustion engine pollution control systems. SSZ-73 is particularly useful for trapping $C_3$ fragments.

EXAMPLES

The following examples demonstrate but do not limit the present invention.

Example 1

Synthesis of SSZ-73

To a Teflon cup for a 23 ml Parr stainless steel reactor, 5 millimoles of 3-ethyl-1,3,8,8-tetramethyl-3-azoniabicyclo[3.2.1]octane hydroxide SDA and 2.10 grams of tetraethyl orthosilicate were added. The aqueous solution of the SDA in its hydroxide form will hydrolyze the orthosilicate ester. The mix of the two reactants was left in a hood without a top to allow the ethanol and water (for the most part) to evaporate over 5-7 days until the internal contents appeared to be dry. The reactor (which had been tared) was re-weighed and a small amount of water was added back in to adjust the $H_2O/SiO_2$ mole ratio to 3.5. Then, 0.20 grams of 48-52% HF was added drop wise and the contents were mixed with a plastic spatula. A thick gel set up. The reactor was closed and heated for 9 days at 150° C. and 43 RPM. The reactor was removed from the oven, cooled to room temperature and a sample was taken for Scanning Electron Microscopy. No crystals were seen, so the reaction was run in series of 6 day increments until a product was seen at 27 days. The contents of the reactor were then collected in a fritted filter with copious water washing. After drying, the crystalline product was found, by x-ray diffraction, to be SSZ-73. Subsequent runs can have their reaction time about halved by adding seed material.

Example 2

Calcination of SSZ-73

The material from Example 1 was calcined in the following manner. A thin bed of material was heated in a muffle furnace from room temperature to 120° C. at a rate of 1° C. per minute and held at 120° C. for three hours. The temperature is then ramped up to 540° C. at the same rate and held at this temperature for five hours, after which it was increased to 594° C. and held there for another five hours. A 50/50 mixture of air and nitrogen was passed over the SSZ-73 at a rate of 20 standard cubic feet (0.57 standard cubic meters) per minute during heating.

What is claimed is:

1. A process for treating a cold-start engine exhaust gas stream containing hydrocarbons and other pollutants consisting of flowing said engine exhaust gas stream over molecular sieve bed which preferentially adsorbs the hydrocarbons over water to provide a first exhaust stream, and flowing the first exhaust gas stream over a catalyst to convert any residual hydrocarbons and other pollutants contained in the first exhaust gas stream to innocuous products and provide a treated exhaust stream and discharging the treated exhaust stream into the atmosphere, the molecular sieve bed comprising a crystalline one-dimensional molecular sieve comprising essentially all silicon oxide and a nitrogen micropore volume of at least about 0.25 cc/gm and having, after calcination, the X-ray diffraction lines of TABLE II.

TABLE II

| Calcined SSZ-73 | | |
|---|---|---|
| 2 Theta[a] | d-spacing (Angstroms) | Relative Integrated Intensity (%) |
| 8.84 | 10.00 | VS |
| 10.69 | 8.27 | W |
| 12.53 | 7.06 | W |
| 16.50 | 5.37 | W |
| 19.54 | 4.54 | W |

TABLE II-continued

| Calcined SSZ-73 | | |
|---|---|---|
| 2 Theta[a] | d-spacing (Angstroms) | Relative Integrated Intensity (%) |
| 19.88 | 4.46 | W |
| 21.49 | 4.13 | W |
| 25.23 | 3.53 | W |
| 27.48 | 3.24 | W |
| 33.38 | 2.68 | W |

[a]±0.1.

2. The process of claim 1 wherein the engine is fueled by a hydrocarbonaceous fuel.

3. The process of claim 1 wherein the engine is an internal combustion engine.

4. The process of claim 3 wherein the internal combustion engine is an automobile engine.

5. The process of claim 1 wherein the molecular sieve has deposited on it a metal selected from the group consisting of platinum, palladium, rhodium, ruthenium, and mixtures thereof.

6. The process of claim 5 wherein the metal is platinum.

7. The process of claim 5 wherein the metal is palladium.

8. The process of claim 5 wherein the metal is a mixture of platinum and palladium.

* * * * *